United States Patent
Miyoshi

(10) Patent No.: US 7,978,250 B2
(45) Date of Patent: Jul. 12, 2011

(54) LENS BARREL AND IMAGE PICKUP DEVICE THEREFOR

(75) Inventor: Kaori Miyoshi, Fuchu (JP)

(73) Assignee: Canon Kabushiki Kaisha (JP)

( * ) Notice: Subject to any disclaimer, the term of this patent is extended or adjusted under 35 U.S.C. 154(b) by 333 days.

(21) Appl. No.: 12/186,015

(22) Filed: Aug. 5, 2008

(65) Prior Publication Data

US 2009/0040369 A1 Feb. 12, 2009

(30) Foreign Application Priority Data

Aug. 8, 2007 (JP) .................................. 2007-207026

(51) Int. Cl.
*H04N 5/225* (2006.01)
*G02B 13/16* (2006.01)
*G02B 7/02* (2006.01)

(52) U.S. Cl. .......................... 348/335; 348/374; 359/818

(58) Field of Classification Search ......................... None
See application file for complete search history.

(56) References Cited

U.S. PATENT DOCUMENTS

| | | | | |
|---|---|---|---|---|
| 5,655,171 | A | * | 8/1997 | Machida et al. ............... 396/535 |
| 5,678,137 | A | * | 10/1997 | Katayama et al. .............. 396/73 |
| 5,717,969 | A | | 2/1998 | Miyamoto et al. |
| 6,661,970 | B2 | * | 12/2003 | Nomura et al. .................. 396/79 |
| 7,634,190 | B2 | * | 12/2009 | Chiang ......................... 396/144 |
| 2004/0017501 | A1 | * | 1/2004 | Asaga et al. .................. 348/340 |
| 2006/0103756 | A1 | * | 5/2006 | Shiozaki ....................... 348/360 |
| 2006/0159438 | A1 | * | 7/2006 | Kobayashi ...................... 396/79 |
| 2007/0189766 | A1 | * | 8/2007 | Kuwahara et al. ............. 396/542 |

FOREIGN PATENT DOCUMENTS

JP 7-181360 A 7/1995

* cited by examiner

*Primary Examiner* — Sinh Tran
*Assistant Examiner* — Albert H Cutler
(74) *Attorney, Agent, or Firm* — Rossi, Kimms & McDowell LLP

(57) ABSTRACT

A lens barrel capable of reliably housing a flexible printed circuit board without increasing the number of its component parts and its outer diameter. A guide member is inserted in a through hole of a fixing member and projects from a holding member in a direction opposite to the direction toward the subject when the lens barrel is in a collapsed position.

4 Claims, 7 Drawing Sheets

LENS BARREL AND IMAGE PICKUP DEVICE THEREFOR

BACKGROUND OF THE INVENTION

1. Field of the Invention

The present invention relates to a lens barrel and an image pickup device therefor and, more particularly, to a lens barrel provided with a flexible printed circuit board electrically connecting with an image pickup device and to the image pickup device therefor.

2. Description of the Related Art

Flexible printed circuit boards have been used as a means for establishing an electrical connection between an electrically driven unit in a lens barrel supporting a photographic lens used in an image pickup device (camera) and a camera body. Various techniques have been proposed for lens barrels electrically connected to camera bodies through the above-described flexible printed circuit boards (see, for example, Japanese Laid-Open Patent Publication (Kokai) No. 7-181360 (FIG. 1 and other figures).

FIG. 7 is a sectional view showing a configuration of a lens barrel according to an example of an art related to the present invention.

Referring to FIG. 7, a lens barrel 700 disclosed in Japanese Laid-Open Patent Publication (Kokai) No. 7-181360 is attached to a camera body 101 and comprises lenses L1 to L4, electric component parts 102 to 104, flexible printed circuit boards (hereinafter referred to as "FPCs") 105 and 106. The FPCs 105 and 106 are guided by being bent along a guide member 107, with their bent portions pinched and fixed with a clip member 108 on the bending guide member 107.

According to the related art disclosed in Japanese Laid-Open Patent Publication (Kokai) No. 7-181360, there is a need to provide the bending guide member 107 and the clip member 108 in the lens barrel 700 for the purpose of guiding the FPCs. There are, therefore, problems that the number of component parts and the outer diameter of the lens barrel 700 are increased.

Because of the structure in which the FPC 105 is folded several times, there is a need to set the length of the FPC 105 to a value much larger than the distance through which the electric component (electrically driven unit) is moved. This leads to an increase in material cost of the FPC 105 and also affects the electrical characteristics of the FPC 105 to cause, for example, an increase in resistance of the conductor in the FPC 105.

SUMMARY OF THE INVENTION

The present invention provides a lens barrel capable of reliably housing a flexible printed circuit board without increasing the number of its component parts and its outer diameter and an image pickup device therefor.

In a first aspect of the present invention, there is provided a lens barrel having an image pickup element for photoelectrically converting an optical image of a subject formed through a lens into an electrical signal, the lens barrel comprising a holding member adapted to hold the image pickup element, a fixing member, having a through hole, adapted to fix the holding member disposed on the side opposite from the subject side in an optical axis direction, an electrically driven unit capable of moving along the optical axis direction between an image pickup position of the lens barrel and a collapsed position of the lens barrel, a flexible printed circuit board having its one end connected to the electrically driven unit, and a guide member extended along the optical axis direction from the electrically driven unit, the guide member being capable of being inserted in the through hole of the fixing member, wherein the guide member is inserted in the through hole of the fixing member and projects from the holding member in a direction opposite to the direction toward the subject when the lens barrel is in the collapsed position.

In a second aspect of the present invention, there is provided an image pickup device comprising the lens barrel.

According to the present invention, the guide member is configured so as to be inserted in the through hole of the fixing member and to project from the holding member in a direction opposite to the direction toward the subject when the lens barrel is in the collapsed position. With this arrangement, the flexible printed circuit board can be prevented from bending largely inwardly when lens barrel is moved from an extended state to the collapsed state and from interfering with another component part so that it cannot be housed. As a result, the flexible printed circuit board can be reliably housed in the lens barrel without increasing the number of component parts and the outer diameter of the lens barrel.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

Figure 1:
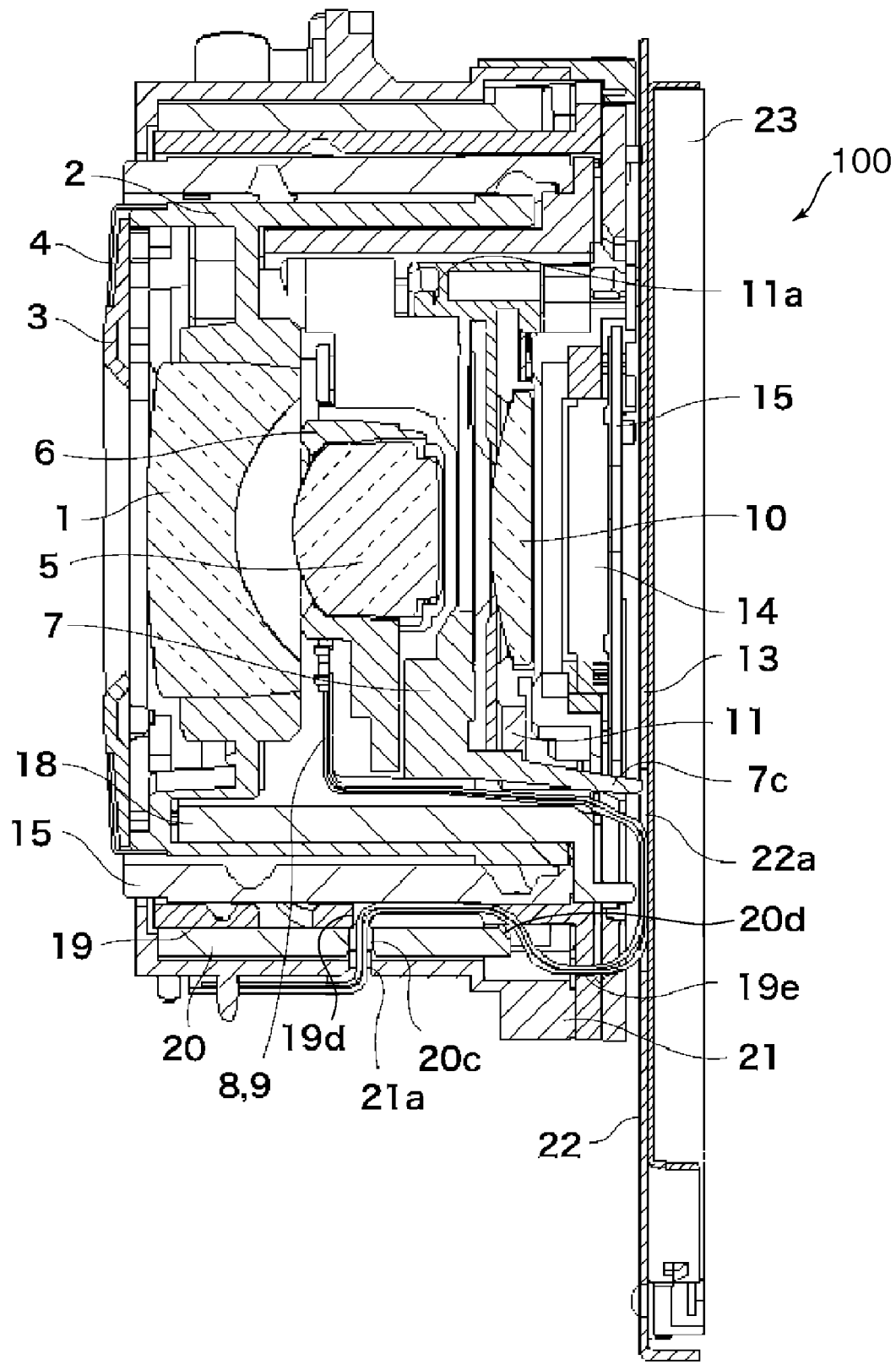
FIG. 1 is a sectional view showing the construction of a lens barrel according to an embodiment of the present invention along an optical axis thereof.
Figure 2:
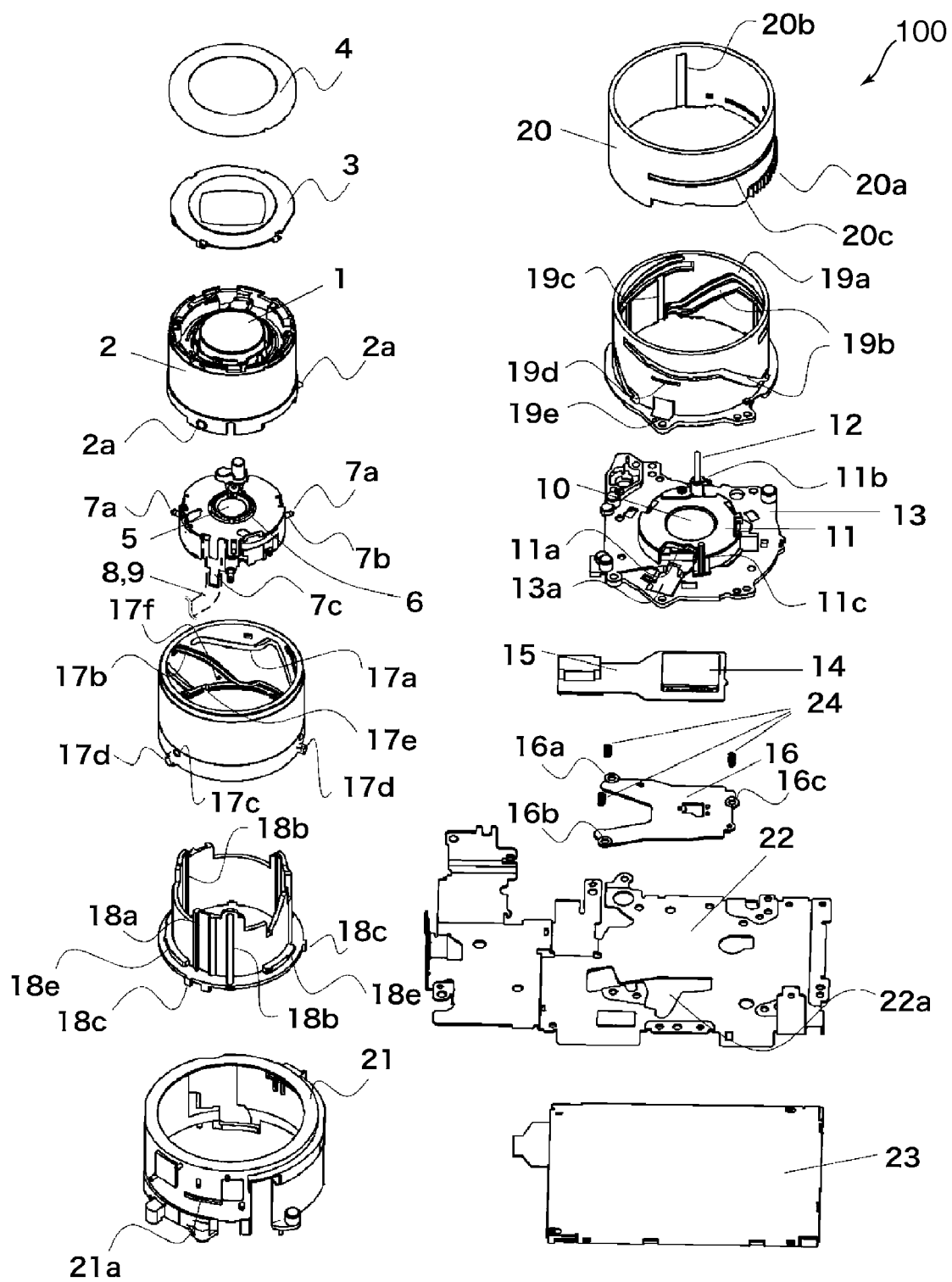
FIG. 2 is an exploded perspective view showing component parts of the lens barrel shown in FIG. 1.
Figure 3:
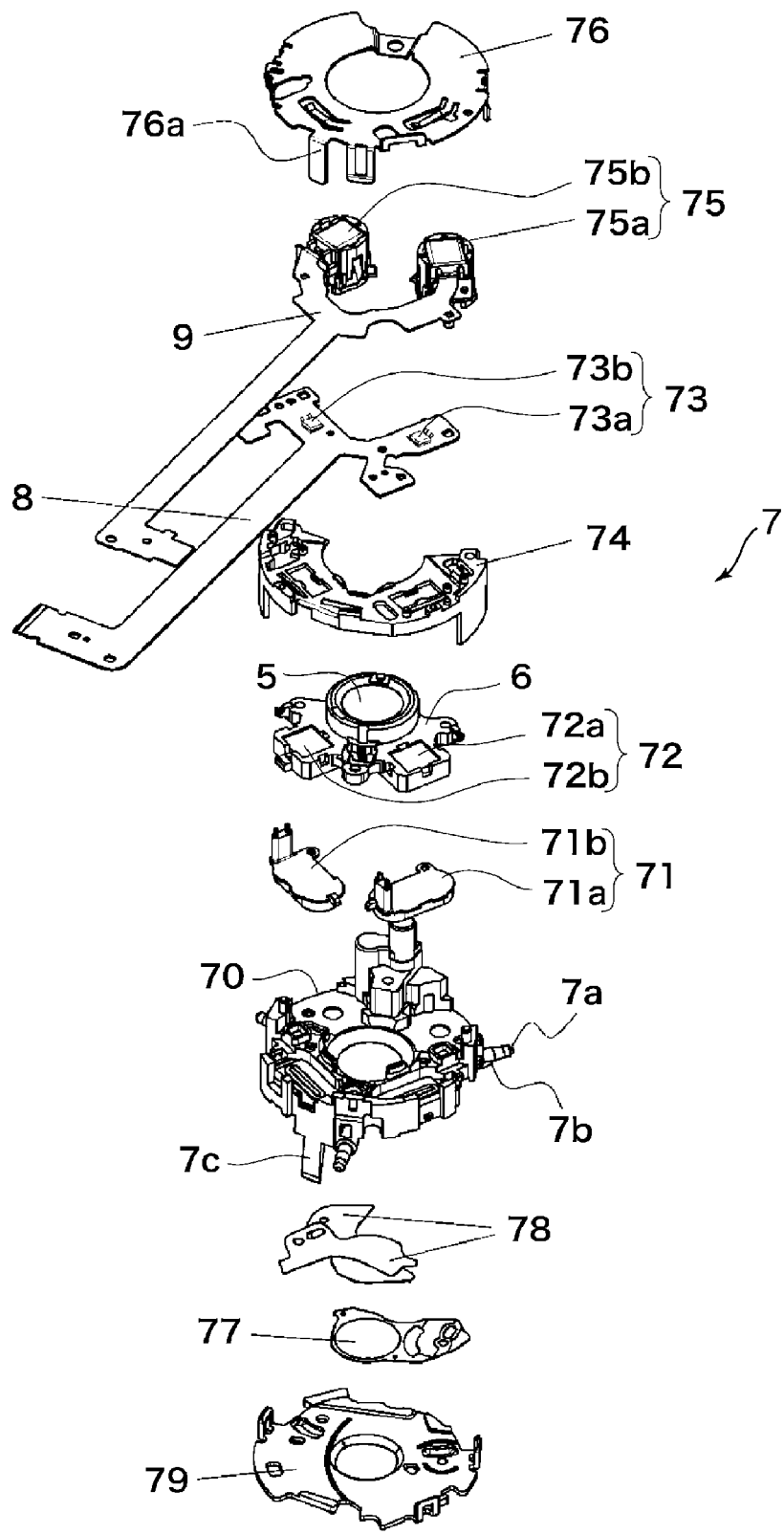
FIG. 3 is an exploded perspective view showing component parts of a second group lens unit in the lens barrel.
Figure 4:
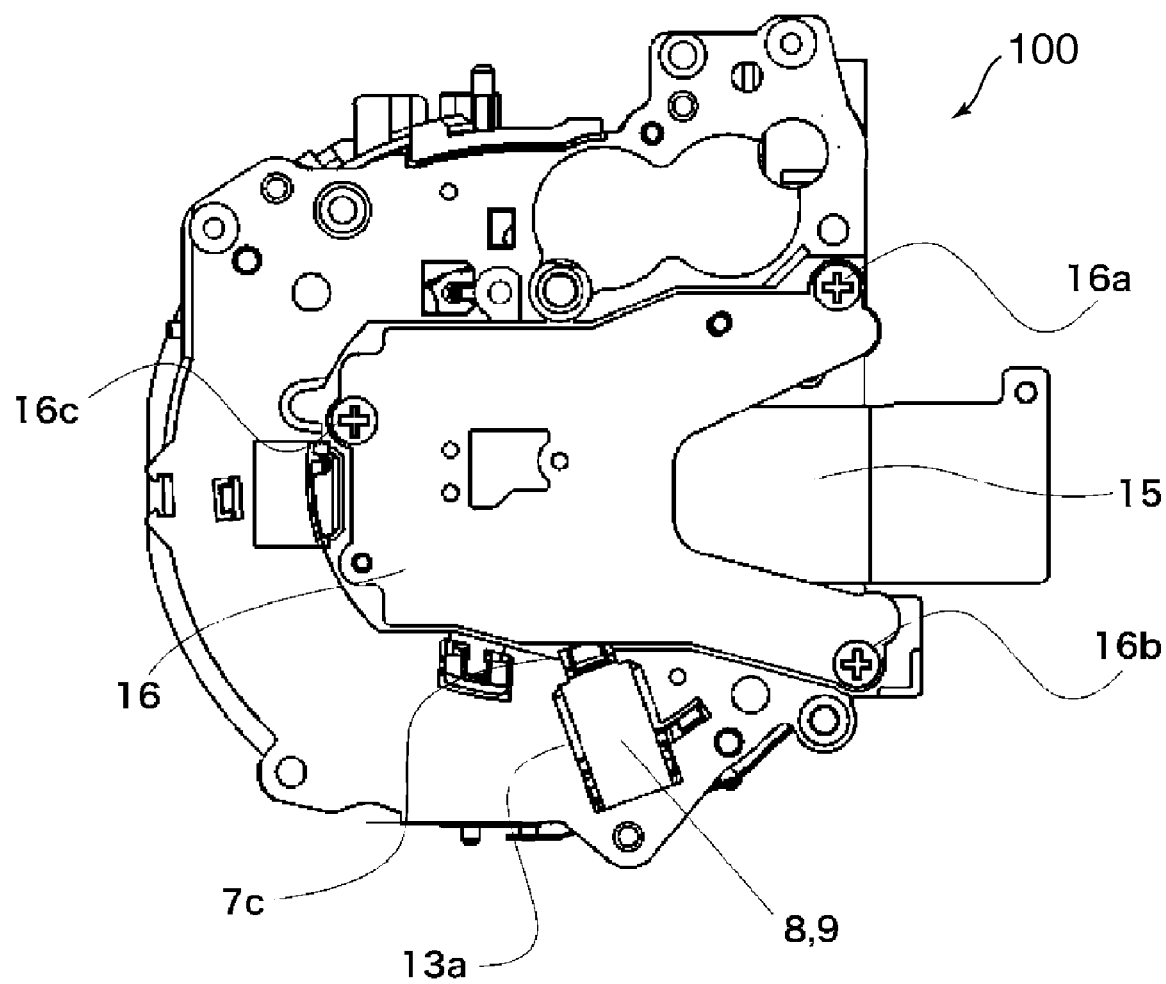
FIG. 4 is a rear view showing the lens barrel in a collapsed state seen from the CCD holding frame side.

FIG. 1 is a sectional view showing the construction of a lens barrel according to an embodiment of the present invention along an optical axis thereof. FIG. 2 is an exploded perspective view showing component parts of the lens barrel shown in FIG. 1. FIG. 3 is an exploded perspective view showing component parts of a second group lens unit of the lens barrel. FIG. 4 is a rear view showing the lens barrel in a collapsed state seen from the CCD holding frame side.

Referring to FIGS. 1 to 4, a lens barrel 100 is provided with a first group lens 1, a first group lens holding member 2, a cover member 3, a second group lens 5, a cap member 4, a second group lens holding member 6, a second group lens unit 7, FPCs 8 and 9, a third group lens 10, a third group lens holding member 11, a main guide member 12, and a base member 13. The lens barrel 100 is further provided with a CCD 14, a CCD flexible circuit board 15, a CCD holding frame 16, a cam cylinder 17, a straight-moving member 18, a fixing cylinder 19, a drive cylinder 20, a cover member 21, a chassis member 22, and an LCD unit 23.

The first group lens 1 is held by the first group lens holding member 2. Cam followers 2a are formed on outer peripheral portions of the first group lens holding member 2 at three positions equally spaced apart by 120 degrees in the circumferential direction. The cam followers 2a follow cams provided in the cam cylinder 17 to enable the first group lens holding member 2 to move in the optical axis direction. The cover member 3 is attached to the first group lens holding member 2. The cap member 4 is attached outside the cover member 3. The second group lens 5 is held by the second group lens holding member 6.

The second group lens unit 7 (electrically driven unit) has, as shown in FIG. 3, the FPC 8 constituting a drive control unit for moving the second group lens holding member 6 in a plane orthogonal to the optical axis, and the FPC 9 constituting a shutter unit for the second group lens unit 7. Cam followers 7a and straight movement guide portions 7b are formed integrally on outer peripheral portions of the second group lens unit 7 at three positions equally spaced apart by 120 degrees in the circumferential direction. The cam followers 7a follow cam grooves 17b in the cam cylinder 17 to enable the second lens unit 7 to move in the optical axis direction between a collapsed position of the lens barrel 100 (shown in FIG. 1) and image pickup positions (a WIDE position shown in FIG. 5 and a TELE position shown in FIG. 6, both of which are described below in detail) of the lens barrel 100.

A guide portion 7c (guide member) extending along the optical axis direction and capable of being inserted in a through hole 13a in the base member 13 is further formed on an outer peripheral portion of the second group lens unit 7. The guide portion 7c is formed so as to project from the CCD holding frame 16 on the side opposite from the subject side (in a direction opposite to the camera-to-subject direction) while being inserted in the through hole 13a of the base member 13 when the lens barrel 100 is in the collapsed position (FIG. 1). That is, the length of the guide portion 7c is set to such a value that when the lens barrel is in the collapsed position, the guide portion 7c protrudes beyond the base member 13 in the direction opposite to the subject direction and does not interfere with the LCD unit 23. Component parts of the second group lens unit 7 will be described with reference to FIG. 3.

The second group lens unit 7 comprises, as shown in FIG. 3, a second group base 70, a coil unit 71, a magnet assembly 72, a hall element assembly 73, a sensor holding member 74, a driving section 75, a second group cover 76, an ND filter 77, shutter blades 78, and a shutter cover 79. The above-described cam followers 7a, straight movement guide portions 7b and guide portion 7c are provided on the second group base 70. The component parts of the second group lens unit 7 are constructed so as to be able to move along the optical axis direction integrally with the second group base 70.

The coil unit 71 is constituted by a pair of coil units 71a and 71b. The magnet assembly 72 is constituted by a pair of magnetized magnets 72a and 72b and fixed on the second group lens holding member 6. The hall element assembly 73 is constituted by a pair of hall elements 73a and 73b and mounted on the FPC 8. The sensor holding member 74 holds the hall element assembly 73 and the FPCs 8 and 9.

The driving section 75 is constituted by a pair of driving section 75a and 75b. The driving section 75a drives the ND filter 77. The driving section 75b drives the shutter blades 78. A projection 76a extending along the optical axis direction is provided on the second group cover 76. The second group cover 76 fixes the driving section 75 and bends the FPCs 8 and 9 along the optical axis direction by the projection 76a. The shutter cover 79 covers the ND filter 77 and the shutter blades 78.

The FPC 8 has its one end electrically connected to the coil units 71a and 71b and has the other end electrically connected to a camera body (not shown). The FPC 9 has its one end electrically connected to the driving section 75a and 75b and has the other end electrically connected to the camera body. In the present embodiment, the length of the FPC 8 constituting a drive control unit and the length of the FPC 9 constituting a shutter unit are set equal to or slightly longer than the extension distance, depending on the structure for housing the FPCs 8 and 9 described below.

The third group lens 10 is held by the third group lens holding member 11. In the third group lens holding member 11, a recess 11a for allowing passage of the FPCs 8 and 9, a main guide portion 11b and a sub guide portion 11C are formed. The main guide member 12 is fitted to the main guide portion 11b of the third group lens holding member 11 to function as a guide when the third group lens holding member 11 is moved along the optical axis direction.

The base member 13 (fixing member) holds the CCD holding frame 16 and is disposed on the side of the lens barrel 100 opposite from the subject side in the optical axis direction. The base member 13 also holds the main guide member 12 on its outer peripheral portion. The through hole 13a through which the guide portion 7c of the second group lens unit 7 is inserted when extended along the optical axis direction is provided in the base member 13. That is, the through hole 13a of the base member 13 is provided for the purpose of securing bending portions of the FPCs 8 and 9 and preventing the FPCs 8 and 9 from bulging on the inner diametric side of the lens barrel 100 when being bent back.

The CCD 14 is an imaging device which photoelectrically converts an optical image of a subject formed through the first group lens 1, the second group lens 5 and the third group lens 10 into an electrical signal. The CCD 14 is fixed on the CCD holding frame 16 via the CCD flexible circuit board 15. The CCD 14 is mounted on the CCD flexible circuit board 15. The CCD flexible circuit board 15 is a circuit board which electrically connects the CCD 14 to the camera body (not shown).

The CCD holding frame 16 (holding member) holds the CCD 14 by bonding. The CCD holding frame 16 is fixed with screws at three portions: screw mount portions 16a, 16b, and 16c (the plurality of connecting portions), as shown in FIG. 4, with adjustment springs 24 interposed therebetween on the base member 13 on the side opposite from the subject side. Two (16a and 16b) of the three screw mount portions 16a, 16b, and 16c of the CCD holding frame 16 are placed on the outer peripheral side of a boundary defined by the outer diameter of the cover member 21 that is a maximum-diameter member constituting the lens barrel 100. Only one of the screw mount portions 16a, 16b, and 16c may be placed on the outer peripheral side of the boundary defined by the outer diameter of the cover member 21.

Cam grooves 17a corresponding to the cam followers 2a of the first group lens holding member 2 and cam grooves 17b corresponding to the cam followers 7a of the second group lens unit 7 are formed in the cam cylinder 17 on the inner peripheral side of the same. Cam followers 17c and drive pins 17d are respectively formed on the outer peripheral side of the cam cylinder 17 at three positions equally spaced apart by 120 degrees in the circumferential direction. A groove 17e is also formed in the cam cylinder 17 along the circumferential direction on the inner peripheral side of the same and is fitted on the outer peripheral side of the straight-moving member 18 with a predetermined phase.

The straight-moving member 18 regulates the first group lens holding member 2 and the second group lens unit 7 from rotating about the optical axis. A groove 18a which engages with a projection 2c of the first group lens holding member 2 (FIG. 5) is formed in the straight-moving member 18. Straight movement grooves 18b to be engaged with the straight movement guide portions 7b of the second group lens unit 7 are also formed in the straight-moving member 18 at three positions equally spaced apart by 120 degrees in the circumferential direction.

The straight-moving member 18 also has projections 18c formed at three positions equally spaced apart by 120 degrees in the circumferential direction. The projections 18c of the straight-moving member 18 are engaged with straight movement guide grooves 19c of the fixing cylinder 19 to regulate the straight-moving member 18 from rotating. Further, projections 18e are formed on the straight-moving member 18 at three positions equally spaced apart by 120 degrees in the circumferential direction. The projections 18e of the straight-moving member 18 are fitted in a groove 17f of the cam cylinder 17 to enable the straight-moving member 18 and the cam cylinder 17 to move integrally with each other in the optical axis direction while being rotatable relative to each other.

The fixing cylinder 19 is mounted on the base member 13. In the fixing cylinder 19, cam grooves 19a to be engaged with the cam followers 17c of the cam cylinder 17, through cams 19b corresponding to the drive pins 17d of the cam cylinder 17, and straight movement guide grooves 19c along the optical axis direction with which the projections 18c of the straight-moving member 18 is engageable are formed. Further, a through hole 19d for allowing passage of the FPCs 8 and 9 in an outside-diameter direction of the fixing cylinder 19 and a through hole 19e in which the bending portions of the FPCs 8 and 9 are to be positioned are formed in the fixing cylinder 19.

The drive cylinder 20 is disposed on the outer diametral side of the fixing cylinder 19 and is formed so as to be rotatable about the optical axis. A gear portion 20a to which a drive force is transmitted from a drive unit (not shown) is formed on the outer diametric side of the drive cylinder 20. Grooves 20b along the optical axis to be engaged with the drive pins 17d of the cam cylinder 17 are formed on the inner diametric side of the drive cylinder 20 at three positions equally spaced apart by 120 degrees in the circumferential direction. A through hole 20c through which the FPCs 8 and 9 can be passed is formed in the drive cylinder 20 across a predetermined length in the circumferential direction (through a predetermined angle). Further, a recess 20d which, when the lens barrel 100 is in the collapsed position (FIG. 1), is in phase with the through hole 19e of the fixing cylinder 19 to allow the bending portions of the FPCs 8 and 9 to be positioned therein is formed on the inner diametric side of the drive cylinder 20.

The cover member 21 (cylindrical member) is a maximum-diameter member constituting the lens barrel 100 placed on the outer diametric side of the drive cylinder 20. Each of the base member 13 and the fixing cylinder 19 is attached to the cover member 21. A through hole 21a for allowing passage of the FPCs 8 and 9 is formed in the cover member 21.

The chassis member 22 fixes the component parts of the lens barrel 100 (lens barrel unit) to form a framework of the camera body. In the chassis member 22, a through hole 22a is provided at a position such as to overlap the through hole 13a of the base member 13 as viewed in a direction along the optical axis. The chassis member 22 and the base member 13 are fixed to each other with screws via screw mount portions (not shown) provided on the side of the base member 13 opposite from the subject side. The LCD unit 23 has components including a liquid crystal panel and a backlight and is fixed on the chassis member 22.

The operation of the lens barrel 100, the method of fixing the CCD 14, and the way in which the FPC 8 constituting a drive control unit for the second group lens unit 7 and the FPC 9 constituting a shutter unit for the second group lens unit 7 are bent in the above-described embodiment constructed as described above will be described with reference to FIGS. 1 to 6.

The operation of the lens barrel 100 will first be described.

A drive force is transmitted from the drive unit (not shown) to the gear portion 20a of the drive cylinder 20 of the lens barrel 100 to rotate the drive cylinder 20 about the optical axis. With this rotation, the cam cylinder 17 rotates because the grooves 20b of the drive cylinder 20 and the drive pins 17d of the cam cylinder 17 are engaging with each other. In this case, since the cam followers 17c of the cam cylinder 17 are engaging with the cam grooves 19a of the fixing cylinder 19, the cam cylinder 17 turns in the optical axis direction along the cam locus of the cam grooves 19a of the fixing cylinder 19.

At this time, the straight-moving member 18 moves along to optical axis direction integrally with the cam cylinder 17 because the projections 18e of the straight-moving member 18 are engaging with the grooves 17f of the cam cylinder 17 as described above. The straight-moving member 18 moves straight along the optical axis direction because the projections 18c of the straight-moving member 18 are engaged with the straight movement guide grooves 19c of the fixing cylinder 19 to regulate rotating as described above.

As the cam cylinder 17 turns, the first group lens holding member 2 can move as described below. That is, the first group lens holding member 2 can move along the optical axis direction without rotating because, while the cam followers 2a of the first group lens holding member 2 and the cam grooves 17a of the cam cylinder 17 are engaged with each other, the projection 2c of the first group lens holding member 2 and the groove 18a of the straight-moving member 18 are engaged with each other.

Also, the second group lens unit 7 can move along the optical axis direction without rotating because, while the cam followers 7a of the second group lens unit 7 and the cam grooves 17b of the cam cylinder 17 are engaged with each other, the straight movement guide portions 7b of the second group lens unit 7 and the straight movement grooves 18b of the straight-moving member 18 are engaged with each other.

The third group lens holding member 11 is driven by a drive force from a well-known drive mechanism (not shown) to advance or retract (advance toward the subject side or retract from the subject side), thereby performing focusing.

Figure 5:
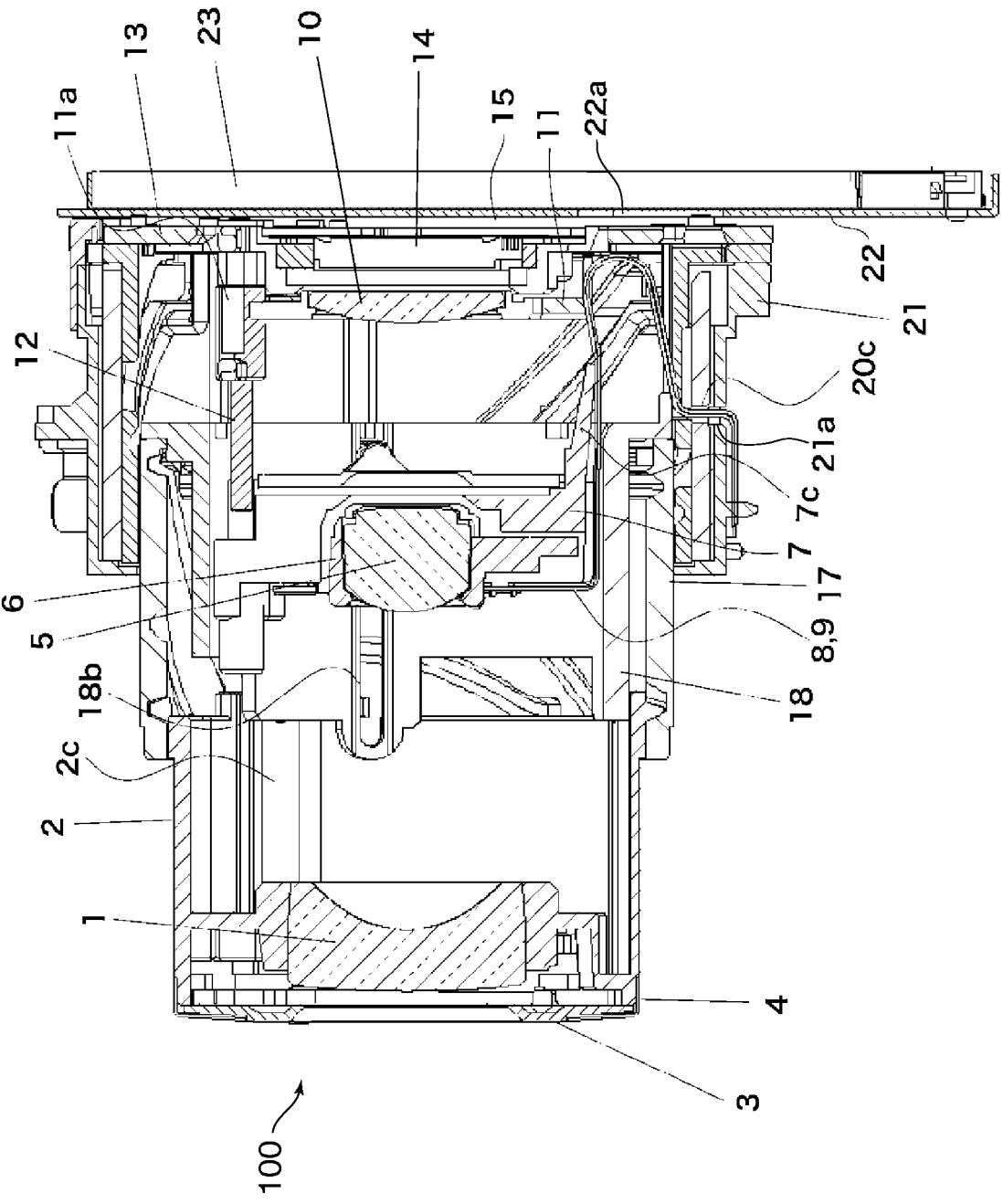
FIG. 5 is a sectional view showing the lens barrel in a WIDE position.

The above described operation of moving the component parts forward is performed so that the lens barrel 100 moves from the collapsed position shown in FIG. 1 to the image pickup position (the wide-angle position shown in FIG. 5 (hereinafter referred to as "WIDE position"): the position for image taking at the wide-angle side), set on the common optical axis with respect to the collapsed position. The drive cylinder 20 is further rotated to perform a zooming operation by moving the position of the lens barrel 100 from the image pickup position (WIDE position) shown in FIG. 5 to the image pickup position shown in FIG. 6 (the telescopic position (hereinafter referred to as "TELE positions"): the position for image taking at the telescopic side). Simultaneously, the third group lens 10 is also moved by the above-described drive mechanism to a predetermined position accompanying the zooming operation.

The method of fixing the CCD 14 on the component parts of the lens barrel 100 will be described.

After assembly of the component parts other than the CCD holding frame 16 to which the CCD 14 mounted on the CCD flexible circuit board 15 is assembled, the CCD holding frame 16 is fixed on the base member 13. That is, the adjustment springs 24 are interposed between the CCD holding frame 16 and the base member 13. Further, the amounts of fastening of the screws on the screw mount portions 16a, 16b, and 16c of the CCD holding frame 16 (FIG. 4) are adjusted so that the position at which a subject optical image is formed on the CCD 14 by means of the optical system (lenses) and the image pickup position of the CCD 14 coincide with each other, and are fixed after the completion of the adjustment.

In the present embodiment, two (16a and 16b) of the three screw mount portions 16a, 16b, and 16c of the CCD holding frame 16 are placed on the outer peripheral side of a boundary defined by the outer diameter of the cover member 21 (FIG. 2) that is a maximum-diameter member constituting the lens barrel 100. The need for provision of screw seats in the vicinity of a center of the CCD holding frame 16 is eliminated in this way, thereby enabling the through hole 13a for securing bending portions of the FPCs 8 and 9 to be provided in the base member 13.

With the increase in the number of wirings accompanying the increase in the number of pixels in CCDs in recent years, CCD flexible circuit boards have been increased in area and it has become difficult to secure a screw seat space while avoiding interference with the CCD flexible circuit board. However, the placement of the screw mount portions 16a and 16b of the CCD holding frame 16 on the outer diametric side enables increasing the degree of design freedom. Further, when the CCD holding frame 16 is adjusted and fixed on the base member 13, it can be adjusted at positions remote from the CCD 14 and has also an advantage of easy fine tuning.

Description will be briefly made of the FPC 8 constituting a drive control unit provided in the second group lens unit 7 and the FPC 9 constituting a shutter unit provided in the second group lens unit 7.

When the coil unit 71a constituting the second group lens unit 7 is energized from a power supply (not shown), a magnetic field is generated therefrom. The magnet 72a is disposed (fixed), at the position corresponding to the position of the coil unit 71a, on the second group lens holding member 6 movable along a plane perpendicular to the optical axis. Therefore the magnet 72a is moved in a first direction by the force of the magnetic field generated from the coil unit 71a. Similarly, when the coil unit 71b is energized, the magnet 72b is moved in a second direction by the force of a magnetic field generated from the coil unit 71b. The first direction and the second direction are perpendicular to the optical axis and are also perpendicular to each other.

The positions to which the magnets 72a and 72b are moved in the second group lens unit 7 are respectively detected with the hall elements 73a and 73b. The position to which the second group lens holding member 6 is moved can be detected by detecting the positions to which the magnets 72a and 72b fixed on the second group lens holding member 6 are moved. Drive of the second group lens holding member 6 is controlled on the basis of detection of the positions to which the second group lens holding member 6 is moved. The first position and the second position are positions located in a plane perpendicular to the optical axis.

When the driving section 75 constituting a shutter unit which is a component of the second group lens unit 7 is energized from a power supply (not shown), arms extending from the driving section 75 become movable to the first and second positions. Since the arms of the driving section 75 become movable to the two positions, each of the ND filter 77 and the shutter blades 78 can be driven between a position at which they cover the opening of the second lens unit 7 and a position to which they retract from the opening.

The way in which the FPCs 8 and 9 provided in the lens barrel 100 are bent will next be described.

Description will first be made of the state of the FPCs 8 and 9 when the lens barrel 100 is in the collapsed position (FIG. 1). The FPCs 8 and 9 having their one ends connected to the second group lens unit 7 are extended toward the CCD 14 side between the second group lens unit 7 and the straight-moving member 18 and extended into the through hole 13a (FIG. 2) of the base member 13 and into the through hole 22a of the chassis member 22 at the rear of the base member 13. Further, the FPCs 8 and 9 are brought into contact with the LCD unit 23 at the rear of the chassis member 22 to be bent back to extend in the opposite direction.

Simultaneously, the guide portion 7c of the second group lens unit 7 is extended along the optical axis direction to be inserted into the through hole 13a of the base member 13, thereby preventing the FPCs 8 and 9 from bulging on the inner diametric side of the lens barrel 100 when being bent back. If the FPCs 8 and 9 bulge on the inner diametric side of the lens barrel 100, the bulge of the FPCs 8 and 9 on the inner diametric side interferes with the third group lens holding member 11 moving along the optical axis direction, when the lens barrel 100 moves from the image pickup position (FIG. 5) to the collapsed position (FIG. 1). There is, therefore, a possibility of failure to suitably house the FPCs 8 and 9 in the lens barrel 100.

In the present embodiment, as described above, the FPCs 8 and 9 are prevented from bulging on the inner diametric side of the lens barrel 100. The FPCs 8 and 9 are thereby enabled to be reliably housed in the space in the lens barrel 100 formed by the through hole 19e of the fixing cylinder 19, the recess 20d of the drive cylinder 20 and the through hole 22a of the chassis member 22.

As described above, the bending portions of the FPCs 8 and 9 are reliably housed in the space formed by the through hole 19e of the fixing cylinder 19, the recess 20d of the drive cylinder 20, the through hole 22a of the chassis member 22 and the guide portion 7c of the second group lens unit 7 when the lens barrel 100 is in the collapsed position (FIG. 1). Thus, there is no need to specially provide a member for absorbing the bending portions of the FPCs 8 and 9 in the lens barrel 100 and, therefore, the number of component parts can be reduced and it is not necessary to increase the outer diameter of the lens barrel 100. As a result, a reduction in diameter of the lens barrel 100 can be achieved.

The length of the guide portion 7c of the second group lens unit 7 is set to such a value that when the lens barrel is in the collapsed position (FIG. 1), the guide portion 7c protrudes beyond the base member 13 on the side opposite from the subject side and does not interfere with the LCD unit 23. In this way, the length of the guide portion 7c of the second group lens unit 7 can be maximized without increasing the size in the optical axis direction of the lens barrel 100 in the collapsed state.

Also, the bending portions of the FPCs 8 and 9 does not enter the inner diametral region of the lens barrel 100 to affect image taking with the CCD 14 when the lens barrel 100 is in the image pickup state. Further, the bending portions of the FPCs 8 and 9 can be prevented from entering the inner diametral region of the lens barrel 100 to interfere with the lens barrel 100 and stop the lens barrel 100 from moving when the lens barrel 100 is moved from one image pickup position (WIDE position) (FIG. 5) to the collapsed position (FIG. 1).

Figure 6:
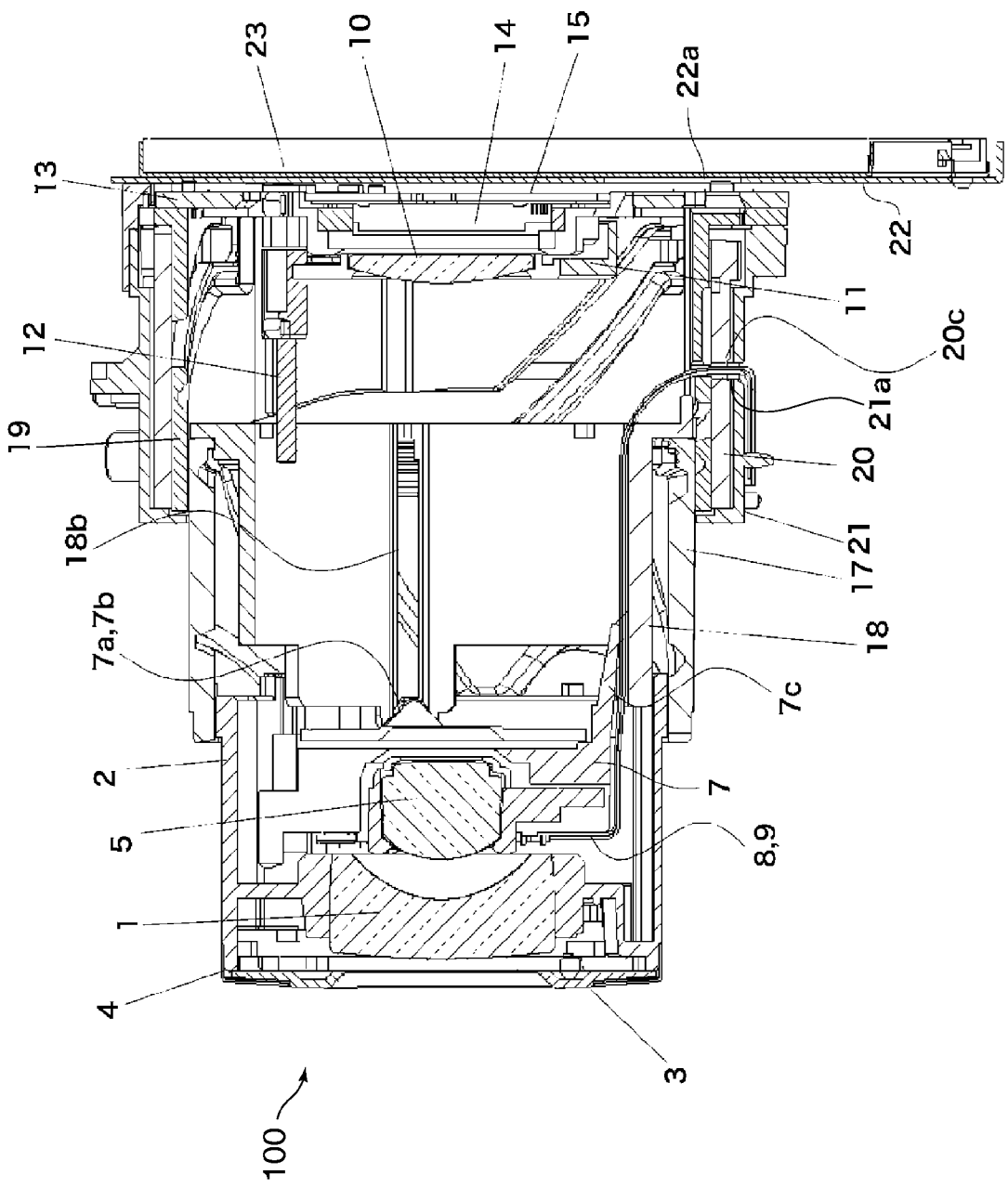
FIG. 6 is a sectional view showing the lens barrel in a TELE position.
Figure 7:
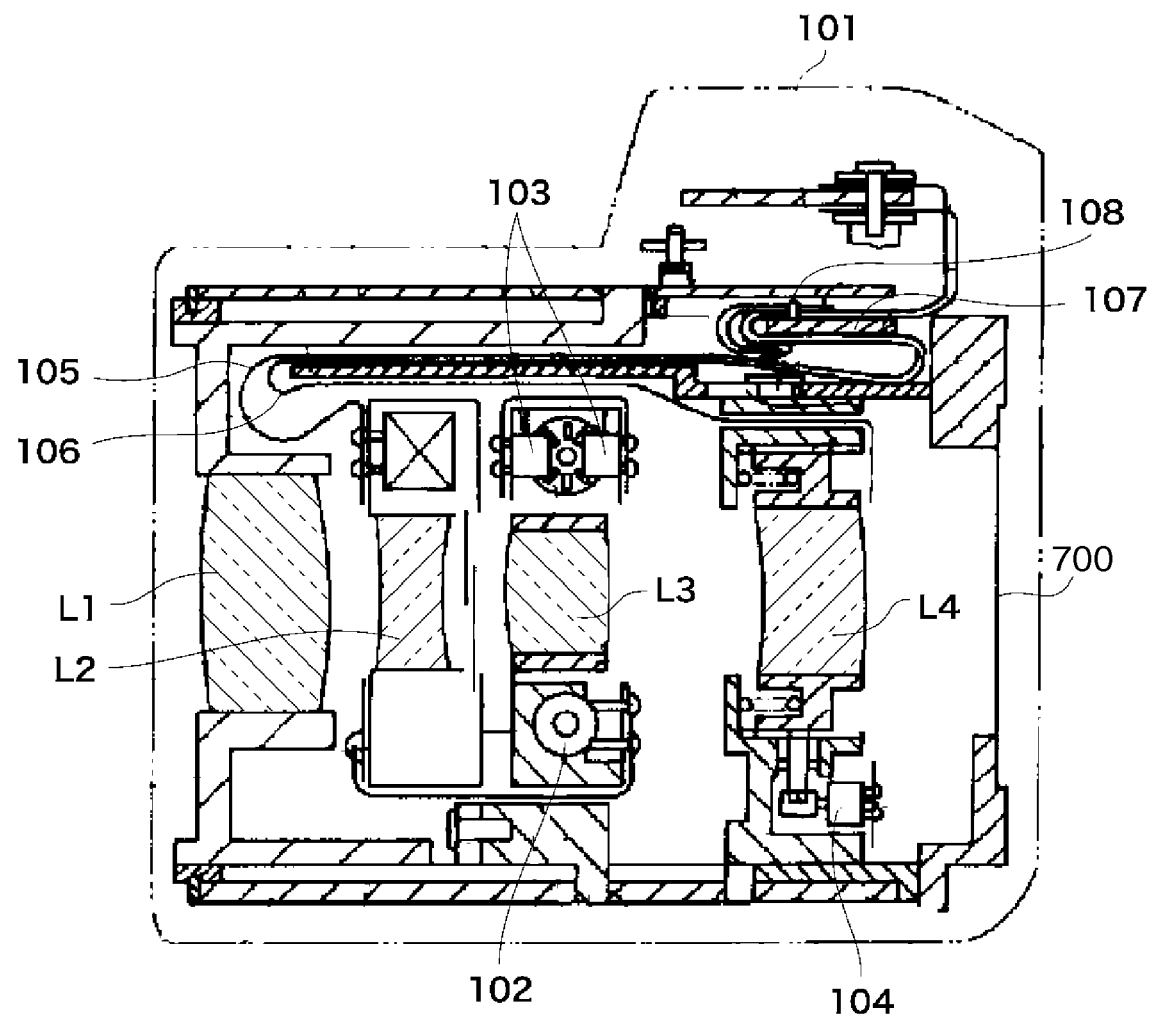
FIG. 7 is a sectional view showing the construction of a lens barrel according to a prior art.

Further, no portions of the FPCs 8 and 9 are bent unnecessarily largely when the lens barrel 100 is in another image pickup position (TELE position) (FIG. 6). The lengths of the FPCs 8 and 9 are thus set close to the possible minimum lengths. The FPCs 8 and 9 in the present embodiment can be formed so as to be shorter than the FPCs disclosed in Japanese Laid-Open Patent Publication (Kokai) No. 7-181360, thus achieving a reduction in cost.

According to the present invention, as described above, the length of the guide portion 7c that moves integrally with the second group base 70 of the second group lens unit 7 is set to such a value that when the lens barrel 100 is in the collapsed state, the guide portion 7c passes through the through hole 13a of the base member 13 and further extends on the side opposite from the subject side. This setting enables preventing the FPCs 8 and 9 from bending largely inwardly in the process of moving the lens barrel 100 from the extended state to the collapsed state and preventing the occurrence of a state in which the FPCs 8 and 9 interfere with another component part moving along the optical axis direction in the lens barrel 100 and cannot be housed in the lens barrel 100.

That is, the bending portions of the FPCs 8 and 9 can be reliably housed in the space formed by the through hole 19e of the fixing cylinder 19, the recess 20d of the drive cylinder 20, the through hole 22a of the chassis member 22 and the guide portion 7c of the second group lens unit 7 when the lens barrel 100 is in the collapsed position. Thus, the bending portions of the FPCs 8 and 9 can be reliably housed in the lens barrel 100 without increasing the number of component parts and the outer diameter of the lens barrel 100. Further, the lengths of the FPCs 8 and 9 may be set substantially equal to or slightly larger than the extension distance. A reduction in material cost of the FPCs 8 and 9 can be achieved thereby while ensuring that the electrical characteristics of the FPCs 8 and 9 are not considerably affected.

The embodiment has been described by way of example with respect to a case where the guide portion 7c is provided on the second group base 70 of the second group lens unit 7. However, the present invention is not limited to this. The guide portion may be provided on any member in the second group lens unit 7 (e.g., the shutter cover 79 or the sensor holding member 74).

The embodiment has been described by way of example with respect to a case where two FPCs for a drive control unit and a shutter unit are formed. However, the present invention is not limited to this. FPCs may be used for components other than the drive control unit and the shutter unit, and only one FPC may be formed.

While the embodiment has been described with respect to the lens barrel 100, the present invention can also be applied to an image pickup device provided with the lens barrel 100.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2007-207026 filed Aug. 8, 2007, which is hereby incorporated by reference herein in its entirety.

What is claimed is:

1. A lens barrel having an image pickup element for photoelectrically converting an optical image of a subject formed through a lens into an electrical signal, said lens barrel comprising:
    a holding member adapted to hold the image pickup element;
    a fixing member, having a through hole, adapted to fix said holding member disposed on the side opposite from the subject side in an optical axis direction;
    an electrically driven unit capable of moving along the optical axis direction between an image pickup position of said lens barrel and a retracted position of said lens barrel;
    a flexible printed circuit board having its one end connected to said electrically driven unit; and
    a guide member extended along the optical axis direction from said electrically driven unit, wherein said guide member is inserted in said through hole of said fixing member while contacting said flexible printed circuit board when said lens barrel is in its retracted position, wherein said guide member is not inserted in said through hole of said fixing member while releasing said flexible printed circuit board therefrom when said lens barrel is moved from a wide position to a tele position,
    wherein said guide member projects from said holding member in a direction opposite to the direction toward the subject when said lens barrel is in the retracted position.

2. The lens barrel according to claim 1, wherein said guide member is provided on one of a base and other members constituting said electrically driven unit.

3. The lens barrel according to claim 1, wherein said holding member comprises a plurality of connecting portions for fixing said holding member on said fixing member, and at least one of said plurality of connecting portions is disposed on the outer peripheral side of a boundary defined by the outer diameter of a maximum-diameter tubular member constituting said lens barrel.

4. An image pickup device comprising the lens barrel according to claim 1.

* * * * *